United States Patent
Ishii

[19]

[11] Patent Number: 6,144,535
[45] Date of Patent: Nov. 7, 2000

[54] DEVICE LOAD VARIATION PROTECTION CIRCUIT

[75] Inventor: Katsuhiro Ishii, Tokyo, Japan

[73] Assignee: NEC Corporation, Tokyo, Japan

[21] Appl. No.: 09/246,984

[22] Filed: Feb. 9, 1999

[30] Foreign Application Priority Data

Feb. 12, 1998 [JP] Japan .................................. 10-029719

[51] Int. Cl.[7] .................................................. H02H 3/00
[52] U.S. Cl. ............................... 361/1; 361/78; 330/207 P
[58] Field of Search .................... 361/1, 54, 55, 361/78; 330/298, 51, 207 P

[56] References Cited

U.S. PATENT DOCUMENTS 3,694,754  9/1972  Baltzer ...................................... 455/287
5,684,662  11/1997 Jo et al. ...................................... 361/28

FOREIGN PATENT DOCUMENTS 58-82049   6/1983  Japan .
63-92440   6/1988  Japan .
6-252785   9/1994  Japan .

Primary Examiner—Michael J. Sherry
Attorney, Agent, or Firm—Scully, Scott, Murphy & Presser

[57] ABSTRACT

A device load variation protection circuit connected to an output side of a device to protected the device from a variation in a load includes a detection circuit, a protection load, and a switch. The detection circuit detects the variation in the load. The protection load is connected to the output side of the device so as to be switchable between connection and disconnection. The switch switches between connection and disconnection of the protection load on the basis of a detection result from the detection circuit.

5 Claims, 2 Drawing Sheets

DEVICE LOAD VARIATION PROTECTION CIRCUIT

BACKGROUND OF THE INVENTION

1. Field of the Invention

The present invention relates to a device load variation protection circuit and, more particularly, to a circuit for protecting a device from a variation in a load for the device.

2. Description of the Prior Art

For example, a portable radio unit uses a power amplifier to amplify the transmission output. In a device such as a power amplifier, the characteristics of the device itself very greatly due to variations in a load impedance connected to the output terminal of the device. This may result in an increase in current consumption, degradation in power output efficiency, or damage to the device.

Under these circumstances, as a conventional countermeasure a load matching device such as an isolator is inserted to stabilize the output load of a device.

In another prior art disclosed in Japanese Unexamined Patent Publication No. 6-252785, a device is protected from a load variation as follows. In this prior art, the state of an antenna (the presence/absence of an antenna output) is detected, and the power supply of the device itself is switched for protection from a load variation.

However, in the above arrangement having a load matching device such as an isolator, the isolator itself has an attenuation amount, and the output power of the device itself must be made larger to obtain a desired radiation power as an antenna output. However, since it is not easy to increase the output power of the device, the increase in radiation power results in an increase in current consumption.

In the prior art disclosed in Japanese Unexamined Patent Publication No. 6-252785, the power supply of the device is instantaneously switched, and this is not preferable from the viewpoint of reliability or service life of the device.

SUMMARY OF THE INVENTION

The present invention has been made in consideration of the above situation, and has as its object to provide a device load variation protection circuit capable of protecting a device from a load variation.

It is another object of the present invention to provide a portable radio unit using the device load variation protection circuit.

In order to achieve the above objects, according to a first aspect of the present invention, there is provided a device load variation protection circuit connected to an output side of a device to protect the device from a variation in a load, comprising detection means for detecting the variation in the load, a protection load connected to the output side of the device so as to be switchable between connection and disconnection, and a switching section for switching the protection load between connection and disconnection on the basis of a detection result from the detection means.

According to a second aspect of the present invention, there is provided a device load variation protection circuit for protecting an amplification circuit for amplifying an intensity of a signal to be radiated to a free space through an antenna, wherein a load between the antenna and the amplification circuit is changed on the basis of a length of the antenna.

According to a third aspect of the present invention, there is provided a device load variation protection circuit for protecting an amplification circuit for amplifying an intensity of a signal to be radiated to a free space through an antenna, comprising a detection section for detecting whether the antenna is completely stretched or completely stored, a protection load connected to an output side of the amplification circuit so as to be switchable between connection and disconnection, and a switching section for switching the protection load between connection and disconnection on the basis of a detection result from the detection section, wherein the antenna is extendable, and when the antenna is completely extended or completely stored, an impedance viewed from the amplification circuit is in a matched state.

According to a fourth aspect of the present invention, there is provided a portable radio unit using the device load variation protection circuit of the second or third aspect.

When the load variation protection circuit of the present invention is used, a large variation in impedance upon extending/retracting the antenna or connecting/disconnecting the output terminal is not observed from the device. For this reason, a decrease in efficiency or destruction of the device itself due to the variation can be prevented.

When the load variation protection circuit of the present invention is used, attenuation after the output terminal of the device decreases because a load matching device such as an isolator is not inserted. Hence, the output power of the device itself decreases when the power at the antenna radiation terminal is kept unchanged. That is, in the above state, when the efficiency of the device does not change, the current consumption or the device can be reduced, i.e., long-term operation can be performed.

In addition, according to the present invention, since the power supply of the device is not instantaneously switched, unlike the prior art disclosed in Japanese Unexamined Patent Publication No. 6-252785, a device with high reliability and long service life can be obtained.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENTS

A preferred embodiment of the present invention will be described below with reference to the accompanying drawings.

The embodiment of the present invention will be described assuming that a power amplifier for amplifying the transmission signal from a radio unit is the device to be protected.

Figure 1:
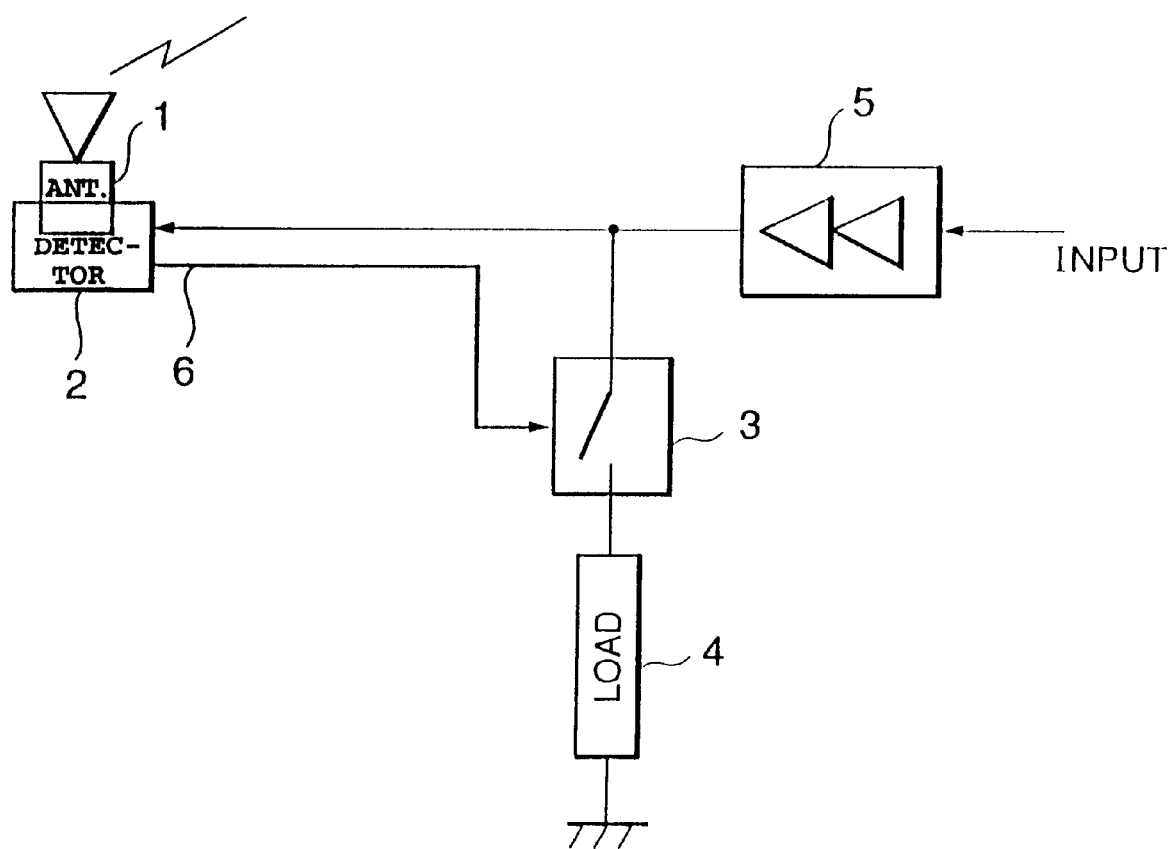
FIG. 1 is a schematic block diagram of a device load variation protection circuit according to an embodiment of the present invention.

FIG. 1 is a schematic block diagram of a device load variation protection circuit according to the embodiment of the present invention.

Referring to FIG. 1, reference numeral 1 denotes an antenna; 2, a detection unit for detecting the storage state, i.e., extension/retraction of the antenna 1; 3, a change-over switch turned on/off on the basis of a detection signal 6 from the detection unit 2; 4, a load whose connection is switched by the change-over switch 3; and 5, a device for amplifying a transmission signal to be transmitted from the antenna 1.

As the characteristic feature of the embodiment of the present invention, the circuit for detecting extension/retraction of the antenna 1, and the change-over switch 3 and load 4 inserted between the output terminal of the device 5 and the antenna 1 are arranged.

The load variation protection circuit having this arrangement prevents a device connected to this circuit from being destroyed due to a large variation in the impedance upon extension/retraction the antenna or connecting/disconnecting the output terminal.

Figure 2:
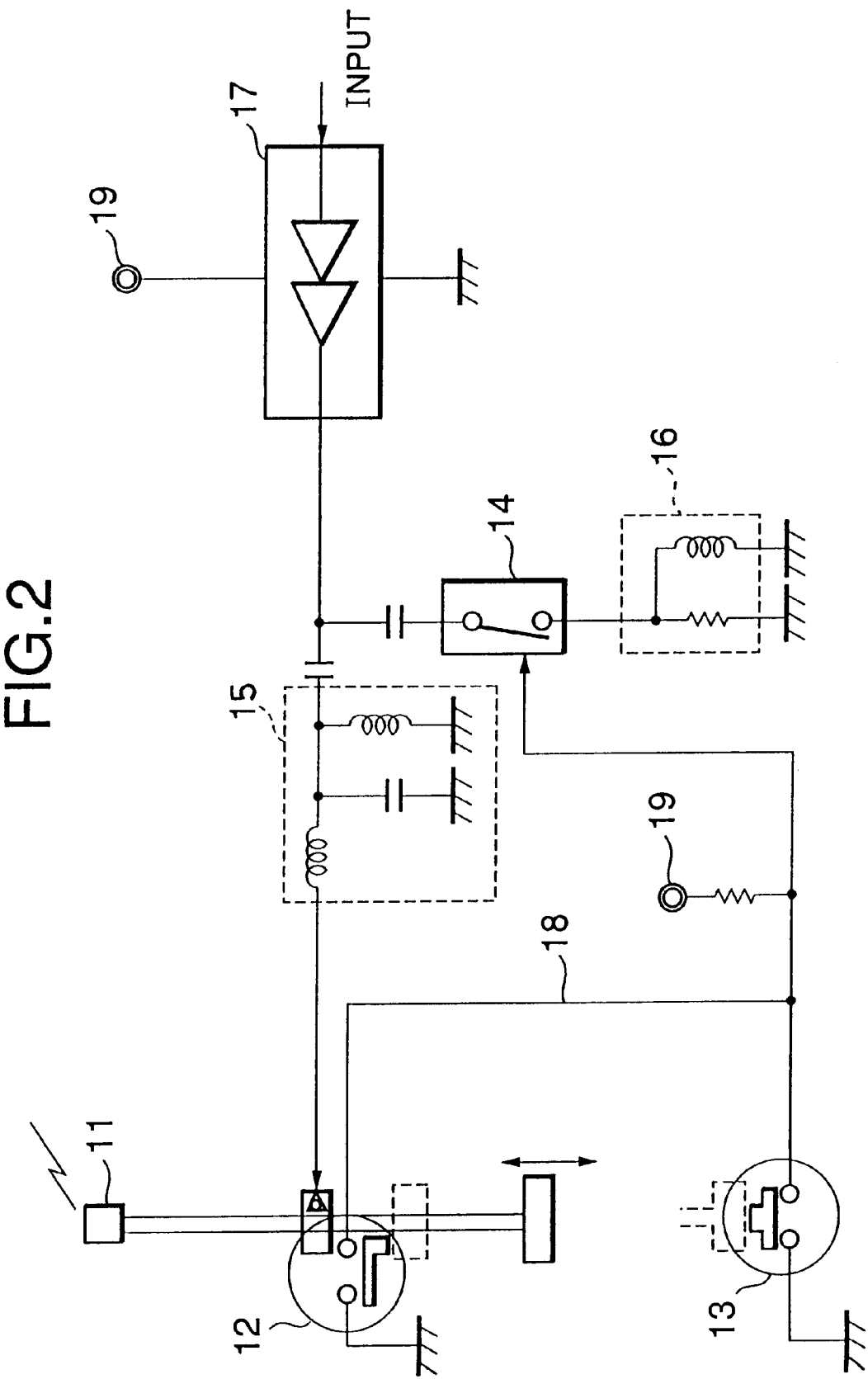
FIG. 2 is a block diagram showing details of the embodiment shown in FIG. 1.

FIG. 2 is a block diagram showing details of the embodiment shown in FIG. 1.

FIG. 2 shows part of the transmission block of a radio device. The transmission block comprises an antenna 11, antenna extension/retraction detection terminals 12 and 13, a load change-over switch 14, an antenna impedance adjustment load 15, a device protection load 16, and a device 17. An input signal is amplified by the device 17 and radiated from the antenna 11 to a free space.

The antenna 11 radiates an input signal to a free space. The antenna extension/retraction detection terminals 12 and 13 are switches each having a mechanical contact and are connected or disconnected in accordance with the extension/storage state of the antenna 11. The change-over switch 14 switches connection/disconnection of the device protection load 16 to/from the output side of the device 17 in correspondence with signals from the antenna extension/retraction detection terminals 12 and 13. This switch 14 has input and output terminals and a control terminal. When the control terminal is electrically active, the input and output terminals are electrically short-circuited. The antenna impedance adjustment load 15 and device protection load 16 adjust the impedance in a matched state when viewed from the device 17. The device 17 is a power amplifier for amplifying an input signal and outputting it.

In FIG. 2, reference numeral 18 denotes an antenna state detection signal, and 19 is a power source.

The operation of the embodiment shown in FIG. 2 will be described next.

Referring to FIG. 2, the detection terminals 12 and 13 monitor the connection state between the antenna 11 and a signal input circuit to the antenna 11. When the antenna 11 is completely retracted and stored, the detection terminal 13 is electrically connected to send a ground signal to the change-over switch 14. When the antenna 11 is completely extended, the detection terminal 12 is electrically connected to send a ground signal to the change-over switch 14. If the antenna 11 is neither completely extended nor completely retracted and stored, neither detection terminals 12 and 13 are electrically connected, so no ground signal is sent to the change-over switch 14.

The change-over switch 14 switches between connection and disconnection of the device protection load 16 in correspondence with the ground signal sent under the above condition. When the antenna 11 is completely stored or extended, the control terminal of the switch 14 is grounded in accordance with the above switch condition. The switch 14 itself is turned off. Conversely, when the antenna 11 is neither completely extended nor completely stored, a voltage is applied to the control terminal of the switch 14, and the switch itself is connected. At this time, the device protection load 16 is parallelly inserted on the output side of the device 17.

When the antenna 11 is neither completely stretched nor completely stored, i.e., the input impedance of the antenna 11 largely deviates from the matching point, the output impedance viewed from the device 17 is not abruptly opened or short-circuited because the protection load 16 is parallelly added which has been adjusted in accordance with the characteristics of the device 17 in advance. Since any abrupt variation in the load for the device 17 can be suppressed, characteristics degradation or destruction of the device 17 due to the load variation can be prevented.

In this embodiment, protection of a device, i.e., power amplifier in the transmission output section of a radio unit having an antenna connected to the output side of the device has been described. However, the present invention is not limited to this. For example, the device may be an output terminal for extracting a signal from a cellular telephone set through a coaxial cable. In this case, the output impedance viewed from the device on the input side of the output terminal varies depending on whether a cable is connected/disconnected to/from the output terminal, and the present invention can be applied to protect this device.

In the above embodiment, the antenna extension/retraction detection terminals 12 and 13 are switches each having a mechanical contact. However, the present invention is not limited to this, and detection may be done by any other mechanism including an electrical mechanism.

In the above embodiment, an electrical signal is sent from the antenna extension/retraction detection terminal 12 or 13 to the switch 14. However, the present invention is not limited to this. Either an electrical signal or mechanical signal can be used, and any other signal form may be employed.

In the above embodiment, the change-over switch 14 is an electrical switch. However, the present invention can substantially be applied to either an electrical or mechanical form.

As the load 15 or 16, a combination of a plurality of elements such as resistors, capacitors, or coils may be used.

The load 15 or 16 may be not only a passive load which only consumes more power but also an antenna, a load with another purpose, or an active load.

In the above embodiment, a power amplifier for amplifying an input signal and outputting it has been described as a typical device to be protected. However, the present invention can be applied to any other device as far as it has characteristics influenced by a load variation.

What is claimed is:

1. A device load variation protection circuit connected to an output side of a device to protect the device from a variation in a load, comprising:

detection means for detecting the variation in said load;

a protection load connected to the output side of said device so as to be switchable between connection and disconnection; and switching means for switching said protection load between connection and disconnection on the basis of a detection result from said detection means.

2. A device load variation protection circuit for protecting an amplification circuit for amplifying an intensity of a signal to be radiated to a free space through an antenna, wherein a load between said antenna and said amplification circuit is changed on the basis of a length of said antenna, said antenna being extendable between a retracted state and an extended state, detection means for detecting a position of said antenna, and switching means for switching said load between connection and disconnection to the amplification circuit on the basis of a detection result from said detection means.

3. A device load variation protection circuit for protecting an amplification circuit for amplifying an intensity of a signal to be radiated to a free space through an antenna, comprising:

detection means for detecting whether said antenna is completely extended or completely stored;

a protection load connected to an output side of said amplification circuit so as to be switchable between connection and disconnection;

switching means for switching said protection load between connection and disconnection on the basis of a detection result from said detection means;

wherein said antenna is extendable, and when said antenna is completely extended or completely stored, an impedance viewed from said amplification circuit is in a matched state.

4. A device load variation protection circuit as claimed in claim 2, in combination with a portable radio unit using said device load variation protection circuit.

5. A device load variation protection circuit as claimed in claim 3, in combination with a portable radio unit using said device load variation protection circuit.

* * * * *